United States Patent [19]
Niogret

[11] 3,809,246
[45] May 7, 1974

[54] FLUID SEPARATION APPARATUS AND MEMBRANE SUPPORT FRAMES THEREFOR

[75] Inventor: Gilbert Niogret, Lyon, France

[73] Assignee: Rhone-Poulenc S. A., Paris, France

[22] Filed: Dec. 15, 1972

[21] Appl. No.: 315,457

[30] Foreign Application Priority Data
Dec. 15, 1971  France .............................. 71.45076

[52] U.S. Cl. ................. 210/232, 210/241, 210/321, 210/433
[51] Int. Cl. ............................................ B01d 25/26
[58] Field of Search ............ 210/232, 321, 433, 241

[56] References Cited
UNITED STATES PATENTS
| | | | |
|---|---|---|---|
| 3,567,028 | 3/1971 | Nose ................................... | 210/232 |
| 3,564,819 | 2/1971 | Neulander et al. ............. | 210/321 X |
| 2,107,805 | 2/1938 | Russell ............................. | 210/321 X |

Primary Examiner—Roy Lake
Assistant Examiner—DeWalden W. Jones
Attorney, Agent, or Firm—Cushman, Darby & Cushman

[57] ABSTRACT

Fluid separating apparatus and a support frame for placing between the membranes thereof, in which the frame comprises a generally rectangular plate, having two faces and two ends, at least one cell forming recess formed in each face, at least one orifice extending through the thickness of the plate adjacent the ends of the plate for the passage of fluid to be treated, a duct for the removal of fluid, which is passed through the membrane supported by the plate over each of said cells forming recesses, an aperture passing through the plate and positioned between at least one of the orifices and the cell forming recess, said aperture having a rules surface along the edge thereof adjacent said cell forming recess, and a detachable clamp located wholly within said aperture to clamp membranes disposed on each of said faces in a fluid-tight manner against said rules surface of said plate.

13 Claims, 11 Drawing Figures

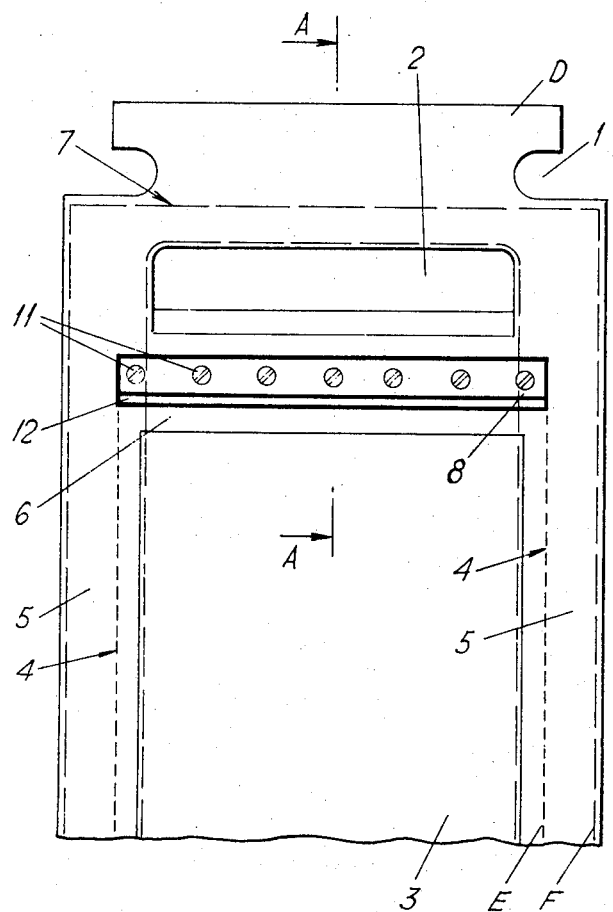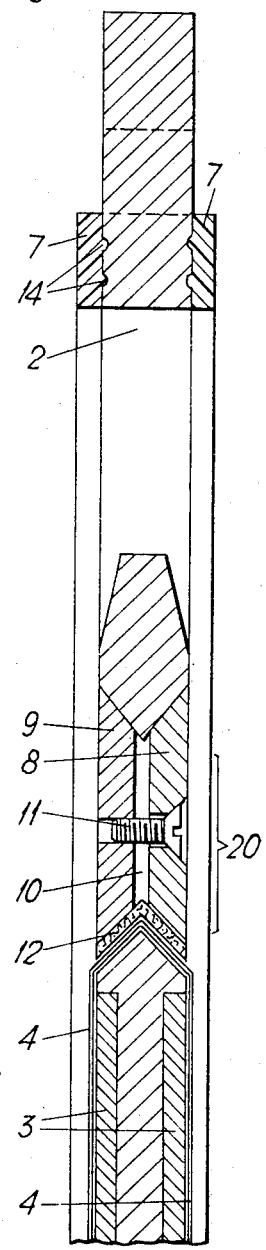

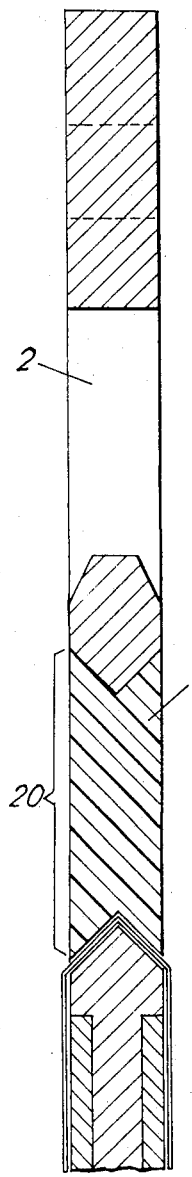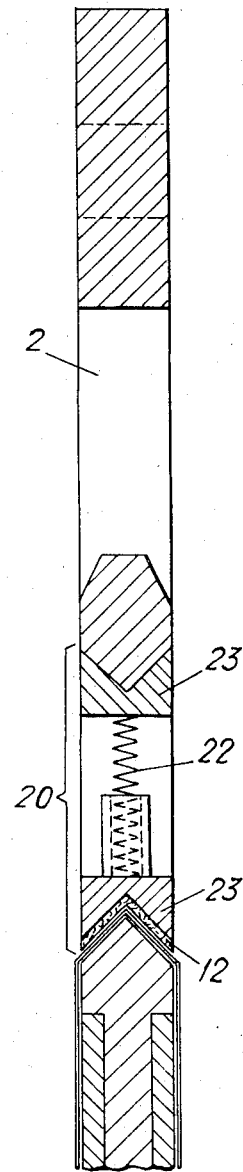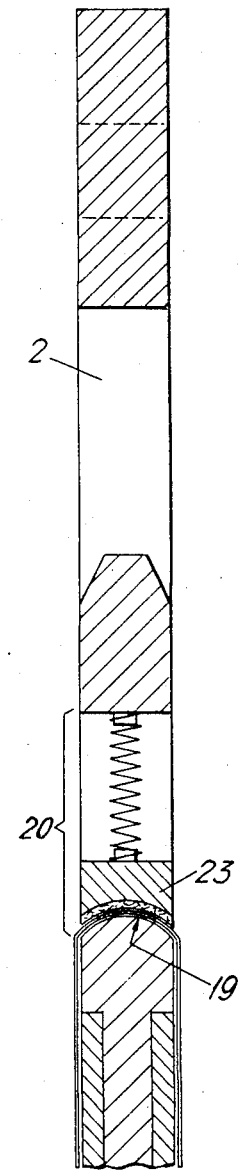

FLUID SEPARATION APPARATUS AND MEMBRANE SUPPORT FRAMES THEREFOR

The present invention relates to fluid separation apparatus and membrane support frames therefore, and is particularly, although not exclusively, concerned with separating apparatus which can be used in ultrafiltration.

Such apparatuses are known, as are membrane support frames which are generally rectangular plates which are formed, at each end, with an orifice for example elongate in shape, for the passage of the fluid to be treated and, on each face, a cell which contains a packing on which a membrane, which covers the edges of the said cell, rests, these being equipped with at least one duct for the removal of the fluid which has passed through the membrane.

In such apparatus the membranes are held in a fluid-tight manner on the longitudinal edges of each cell by leakproofing gaskets which also provide the desired separation between the plates. However, as it is not possible to hold the membranes transversely in a leakproof manner by means of the gaskets between the cell and the elongated orifice, it has been proposed to glue them at these places.

According to the present invention there is provided a membrane support frame for fluid separating apparatus, said frame comprising a generally rectangular plate, having two faces and two ends, at least one cell forming recess formed in each face, at least one orifice extending through the thickness of the plate adjacent the ends of the plate for the passage of fluid to be treated, a duct for the removal of fluid, which is passed through the membrane supported by the plate over each of said cell forming recesses, an aperture passing through the plate and positioned between at least one of the orifices and the cell forming recess, said aperture having a ruled surface along the edge thereof adjacent said cell forming recess, and a detachable clamp located wholly within said aperture to clamp membranes disposed on each of said faces in a fluid-tight manner against said ruled surface of said plate.

By ruled surface there is to be understood a surface generated by a straight line moved parallel to the faces of the plates along a curved or polygonal directrix or along a straight directrix at an angle to the face of the plate. This arrangement avoids wrinkling the membrane when it is clamped in position against the regular surface.

It is thus possible to do away with any gluing of membranes onto the plates.

The invention also provides fluid separation apparatus comprising, stacked in superposed relation, a series of such support frames, a plurality of gaskets located between the successive plates of said frames, a membrane secured against each of the faces of each of said plates over said recesses and clamped by said clamp against said ruled surface and two end plates, one of which is equipped with at least one inlet for the fluid to be treated and one of which is equipped with at least one outlet for the treated fluid.

The invention will be better understood from the following description, given by way of non-limiting example, reference being made to the accompanying drawings, in which:

FIG. 1 is a front elevation showing half of one embodiment of membrane frame according to the invention, with the clamp and membranes in place;

FIG. 2 is an enlarged section, taken along the line AA of FIG. 1;

FIGS. 8, 9 and 10 are views, similar to FIG. 2, of three further embodiments.

Figure 3:
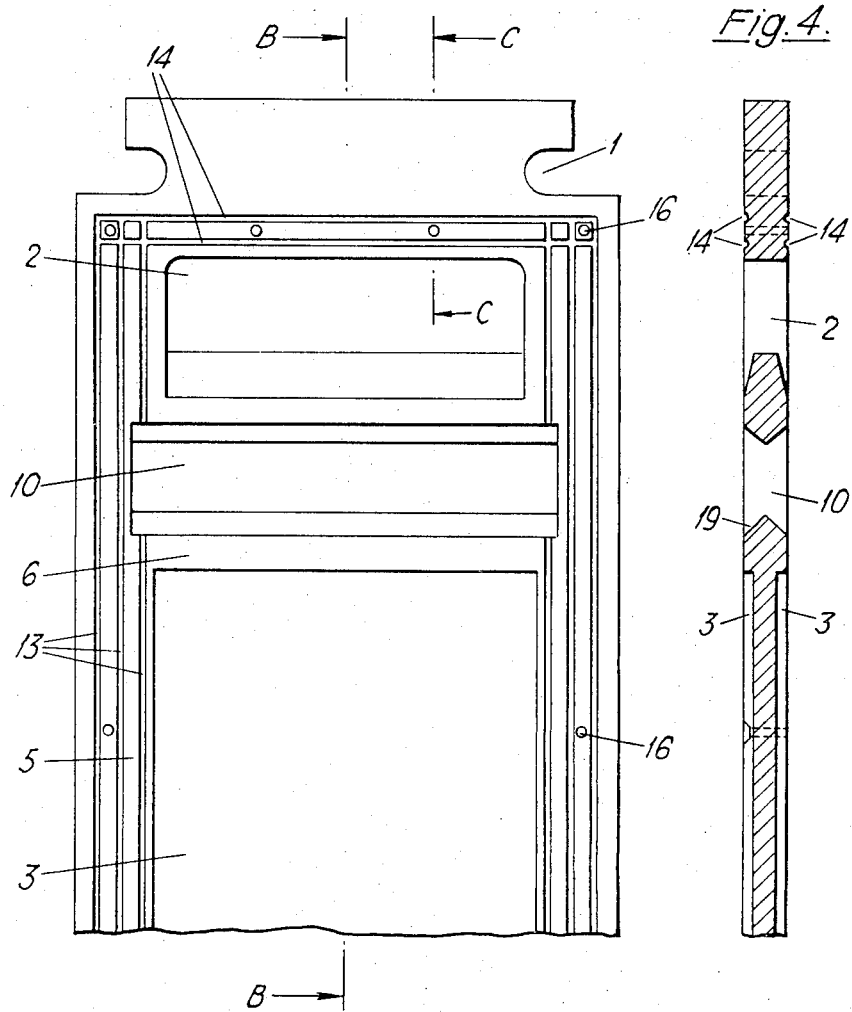
FIG. 3 is a view, similar to FIG. 1, showing in more detail a support plate without its movable components.

A membrane support frame according to the present invention comprises, in particular, a generally rectangular plate having on each face a cell which may be filled with a packing on which a membrane rests, and orifices at each end of the plate.

In FIG. 1, the plate D has been shown in continuous lines of normal thickness, the edges of the membrane in short dashes E, and the edges of the gasket separating two adjacent plates in long dashes F, whilst the detachable clamp is shown in thicker continuous lines.

A plate is substantially symmetrical relative to its large longitudinal axis. It is formed with positioning slots 1 to engage guide bars, the fluid separating apparatus preferably being formed by stacking the plates in a vertical position along horizontal bars. The plate is also formed with elongate orifices 2 near each end for introducing the fluid to be treated and removing the treated fluid after it has passed over the membrane surface. Between the two elongate orifices 2 each membrane support plate is provided with a cell forming recess 3 on each of its faces, these recesses being separated by a thin wall. Each recess 3 contains a packing which acts especially as a support for a membrane. This packing comprises, for example, a plastic grid and a porous support which are substantially of the same dimensions as the cell, the packing being held by an adhesive strip located simultaneously on the porous support and on the edges of the cell. A membrane 4 is placed on the porous support, optionally above a filter paper. It is also possible to give the base of the cell a profile which enables one to drain the fluid which has passed through the membrane and thus to dispense with the grid. The fluid which has passed through the membranes is recovered in at least one duct (not shown) located in the thickness of the plate.

The membrane 4 rests on the packing and extends over the longitudinal and transverse edges 5 and 6 respectively of the recess 3, as shown in FIG. 1. The membrane 4 is held in a leakproof manner against the longitudinal edges 5 of the recess 3 by a gasket 7 (shown in dashes in FIG. 1) when several plates are being clamped together. From FIG. 2, it can be seen that the gaskets 7 are placed on either side of a support plate and that they ensure fluid-tightness at the longitudinal edges of the membranes 4. The gaskets 7 can be held laterally, for example, by extra thicknesses provided on each side of the plate. It is also possible to hold them by means of longitudinal and transverse grooves 13 and 14 (see FIGS. 3 and 4) provided on the edges of the plates. The gaskets become slightly embedded in these grooves when the apparatus is tightened up and they are thus fixed in position.

Figure 6:
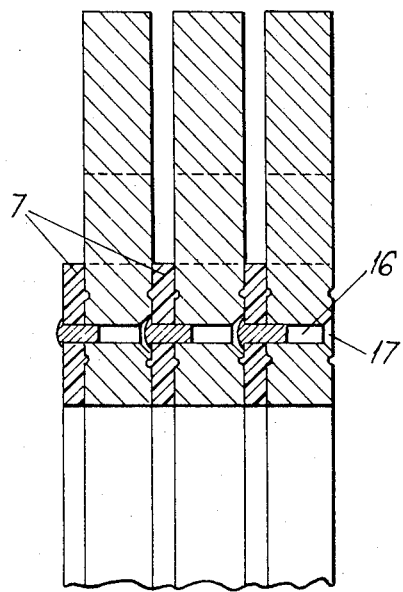
FIG. 6 is a similar view showing the combination of three support frames.
Figure 5:
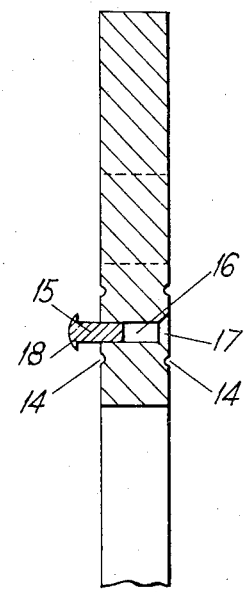
FIG. 5 is an enlarged cross-section taken along the line CC of FIG 3, and on a larger scale, showing more particularly the means for securing a plate and gasket.

In order to make it easier to handle each plate with its attached components (packing, membranes and gasket), it is advantageous to keep the gasket 7 firmly fixed to the plate without having to glue it. To do this, it is possible to "button" the frame joint onto the support plate (FIGS. 5 and 6) by means of anchoring "pins" 15 located at the periphery of the plates and passing into holes formed in the gaskets at the corresponding places. These anchoring pins 15 can be made of a plastic which is slightly less hard than the plate itself and can be force fitted into the holes 16 provided in the plate. It is also wise to countersink the holes 16 at one end in order to make it possible to embed the heads 18 of the anchoring pins 15 of the adjacent plate, as can be seen in FIG. 6. It is also possible to button by a reverse device, that is to say to have anchoring pins firmly fixed to the gaskets 7, these resilient pins being embedded in holes with retaining slots provided in the edges of the plates.

Between each end of the cell forming recess 3 and the nearest elongate orifice 2 the plate is formed with an aperture 10 of which the edge 19 adjacent the side of the cell forming recess 3 is a ruled surface against which each membrane 4 is held over its entire width in a fluid-tight manner by a detachable clamp 20. The detachable clamp is located wholly within the aperture 10, and its thickness corresponds to that of the plate, at least at the ends of the edge on the side of the cell.

It is preferred to give the edge 19 of the aperture 10 on the side of the cell forming recess a profile which is the shape of a V (FIGS. 4, 8 and 9) or of the arc of a circle (FIG. 10). The edge opposite the edge 19 can have any shape whatsoever but it is generally given a shape which is symmetrical relative to the longitudinal axis of the aperture 10.

The detachable clamp represented in FIGS. 1 and 2 located inside the aperture 10 comprises two small plates 8 and 9 which are substantially the same thickness as the plate, after clamping one against the other by means of screws 11. Between these small plates 8 and 9 and the edge 19 of the aperture 10 which is nearest to the cell, a packing 12 rests on the membrane 4 during the clamping of the small plates 8 and 9. If the edge 19 forms a V, the packing 12 has a cross-section in the shape of a herringbone. The distance between each end of the branches of the packing 12 corresponds to the thickness of the plate.

This detachable clamp with small plates completely fills and seals the aperture into which it is inserted.

Figure 4:
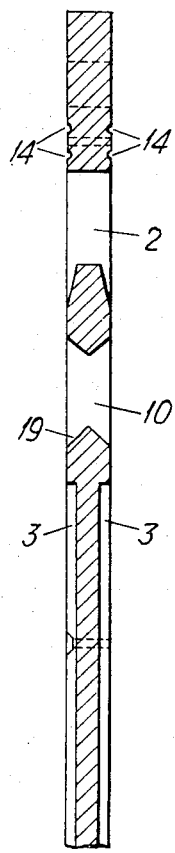
FIG. 4 is a cross-section taken along the line BB of FIG. 3.

The components of a plate (represented in FIGS. 1 and 2) are assembled in the following manner. A support plate such as represented in FIGS. 3 and 4 is taken. The packing, comprising a grid and a porous support is placed in each cell forming recess 3 and this packing is held in position by an adhesive tape placed on the edges of the cell and on the edges of the porous support. The membrane 4 is then positioned on the packing and on each longitudinal edge 5 of the recess. In a modification a plate can be covered by a single membrane which passes through an aperture 10 and covers the packing of the two opposite cells. In order to fix the ends of the membrane (or of the membranes) with the small plates 8 and 9, the ends are first placed on the edge 19 of the aperture 10, making them overlap, and they are covered by the packing 12 (see FIG. 2). The small plates 8 and 9 are then placed in position and the screws 11 are tightened. A similar detachable device 20 can be placed in position at the other end of the plate. A gasket 7 is then buttoned onto the plate by means of the anchoring pins 15 provided on one face of the plate (see FIG. 5). The plate is then completely equipped and ready to be assembled with other similar plates to form a separating apparatus.

Figure 11:
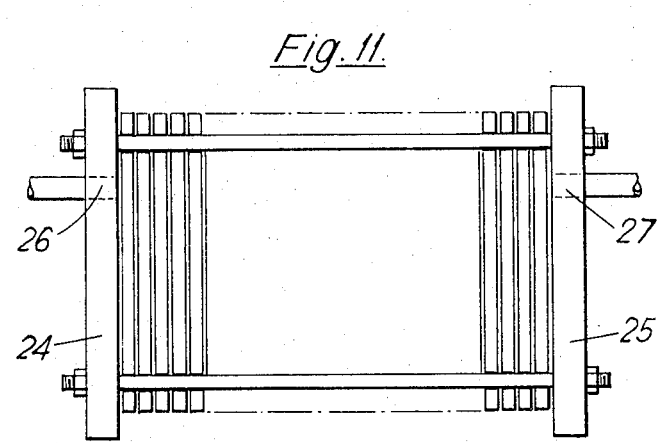
FIG. 11 is a schematic side elevation of a separating apparatus according to the invention.

These plates, separated from one another in a fluid-tight or leakproof manner by the gaskets 7 are located between two end plates 24 and 25 (FIG. 11) one of which is equipped with at least one orifice 26 for introducing the fluid to be treated and the other of which is equipped with at least one orifice 27 for removing the treated fluid. These plates, which are each supplied in parallel, can form a sub-assembly, separated from an adjacent sub-assembly by an intermediate plate, the flow of the fluid from one sub-assembly to the other then taking place in series, as is already known in apparatuses of the prior art.

Figure 7:
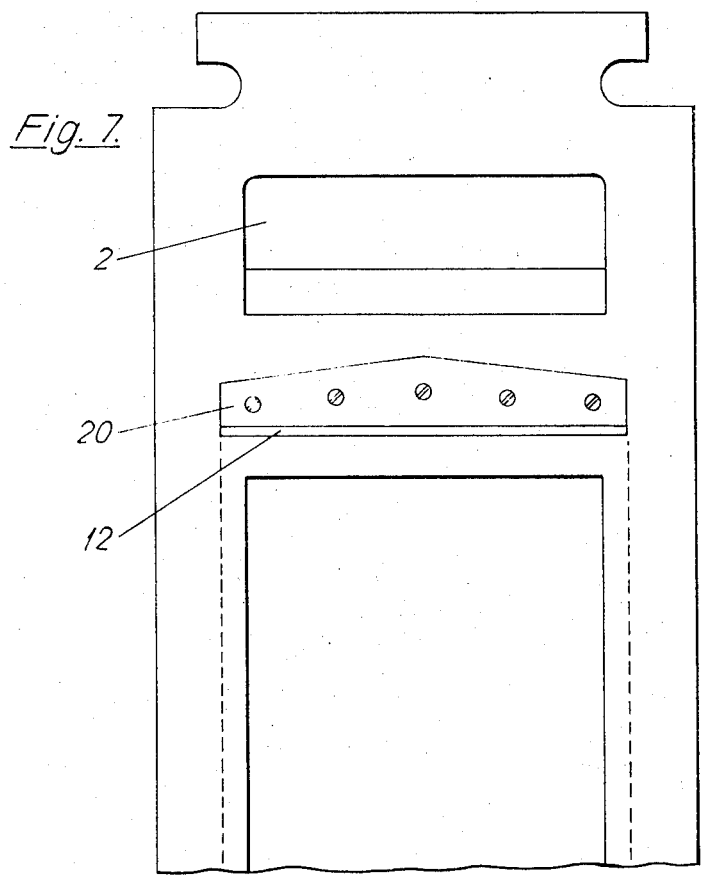
FIG. 7 is a view, similar to FIG. 1, of a modified form of frame.

The edge of the aperture 10 situated on the side of the elongated orifice 2 can have any profile whatsoever, for example, that represented in FIG. 7. Plates such as shown in FIGS. 3 and 4 can be equipped with a detachable clamp 20 consisting of a single resilient piece (see FIG. 8) or a combination consisting of a packing 12, base blocks 23 and springs 22, as shown in FIG. 9. It is also possible to use ball-and-socket joint devices (not shown). FIG. 10 represents another form of the plates, the edge 19 of which has a profile in the shape of the arc of a circle. The detachable clamp 20 here includes a packing held against the edge 19 by springs and a base block 23.

The plates according to the present invention can be made from very diverse materials, as a function of the use for which they are intended and the pressures which they must achieve. They are suitably made out of plastics material, for example, polyvinyl chloride. They can be made from materials of medical or foodstuff compatible quality, which makes their use particularly valuable, especially for treating biological or foodstuff liquids. The parts of the clamps can be of plastics material or of a non-oxidisable metal (stainless steel).

A separating apparatus consisting of plates according to the invention can be used in ultrafiltration and hyperfiltration in chemical industries, the dyestuff industry, the papermaking industry and the like. Furthermore, it can be used in gas permeation.

I claim:

1. A membrane support frame for fluid separating apparatus said frame comprising a generally rectangular plate, having two faces and two ends, means defining a cell forming recess in each face, means defining at least one orifice extending through the thickness of the plate adjacent the ends of the plate for the passage of fluid to be treated, a duct for the removal of fluid, which is passed through a membrane supported by the plate over each of said cell forming recesses, means defining an aperture passing through the plate and positioned between at least one of the orifices and the cell forming recess, said aperture defining means having a ruled surface along the edge thereof adjacent said cell forming recess, and a detachable clamp located wholly within said aperture effective to clamp membranes disposed on each of said faces in a fluid tight manner against said ruled surface of said plate.

2. A membrane support frame as claimed in claim 1, wherein the thickness of said detachable clamp corresponds substantially to the thickness of said plate in the vicinity of said aperture.

3. A membrane support frame as claimed in claim 1, wherein the edge of the aperture adjacent the cell forming recess is perpendicular to the longitudinal plane of symmetry of the plate.

4. A membrane support frame as claimed in claim 1, wherein the said detachable clamp is formed in one piece.

5. A membrane support frame as claimed in claim 1, wherein the said detachable clamp comprises at least one member which may be resiliently urged toward said edge of the aperture.

6. A membrane support frame as claimed in claim 5, wherein the detachable clamp comprises two members having at least one spring interposed therebetween.

7. A membrane support frame as claimed in claim 1, wherein the detachable clamp comprises two plates positionable in said aperture from opposite faces and screw means to secure said two plates together.

8. A membrane support frame as claimed in claim 1, wherein said edge of said aperture has a V-shaped cross-section.

9. A membrane support frame as claimed in claim 8 and further comprising a herring-bone shaped packing positionable between the said detachable clamp and said V-shaped cross-section edge.

10. A membrane support frame as claimed in claim 1, wherein said detachable clamp is substantially of the same thickness as said plate and completely fills the aperture into which it is inserted.

11. Fluid separating apparatus comprising, stacked in superposed relation:
 a. a series of support plates, each comprising a generally rectangular plate, having two faces and two ends, means defining a cell forming recess in each face, means defining at least one orifice extending through the thickness of the plate adjacent the ends of the plate for the passage of fluid to be treated, a duct for the removal of fluid which is passed through a membrane supported by the plate over each of said cell forming recesses, means defining an aperture passing through the plate and positioned between at least one of the orifices and the cell forming recess, said aperture defining means having a ruled surface along the edge thereof adjacent said cell forming recess, and a clamp located wholly within said aperture effective to clamp membranes disposed on each of said faces in a fluid-tight manner against said ruled surface of said plate;
 b. a plurality of gaskets located between the successive said plates;
 c. a membrane secured against each of the faces of each of said plates over said recesses and clamped by said clamp against said ruled surface; and
 d. two end plates, one of which is equipped with at least one inlet for the fluid to be treated and one of which is equipped with at least one outlet for the treated fluid.

12. Apparatus as claimed in claim 11, and further comprising means defining grooves in the faces of the plates into which the gaskets are resiliently deformed.

13. Apparatus as claimed in claim 11, wherein each gasket is secured to its adjacent plate by a pressfitted pin passed therethrough.

* * * * *